(12) United States Patent
Ahmed et al.

(10) Patent No.: US 10,628,174 B2
(45) Date of Patent: Apr. 21, 2020

(54) TRANSFER OF CONTROL OF CONFIGURATION SOURCES

(71) Applicant: Microsoft Technology Licensing, LLC, Redmond, WA (US)

(72) Inventors: Tanvir Ahmed, Bellevue, WA (US); Peter J. Kaufman, Sammamish, WA (US); Shayak Lahiri, Redmond, WA (US); John Chadwell Spaith, Bellevue, WA (US); Janani Vasudevan, Redmond, WA (US); Dennis Edward Flanagan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 360 days.

(21) Appl. No.: 15/046,367

(22) Filed: Feb. 17, 2016

(65) Prior Publication Data
US 2017/0235583 A1    Aug. 17, 2017

(51) Int. Cl.
*G06F 1/24* (2006.01)
*G06F 9/445* (2018.01)
(Continued)

(52) U.S. Cl.
CPC ............ *G06F 9/44505* (2013.01); *G06F 1/24* (2013.01); *G06F 9/445* (2013.01);
(Continued)

(58) Field of Classification Search
None
See application file for complete search history.

(56) References Cited

U.S. PATENT DOCUMENTS 5,349,674 A * 9/1994 Calvert ............... G06F 11/0748
709/227
7,350,226 B2    3/2008 Moriconi et al.
(Continued)

FOREIGN PATENT DOCUMENTS

EP    2372537 A1    10/2011
WO    2016007813 A1    1/2016

OTHER PUBLICATIONS

Second Written Opinion Issued in PCT Application No. PCT/US2017/017086, dated Jan. 22, 2018, 5 Pages.
(Continued)

*Primary Examiner* — Tanh Q Nguyen
(74) *Attorney, Agent, or Firm* — NovoTechIP International PLLC (57) ABSTRACT

A configuration control transfer ("CCT") system controls the transferring of control of configuration information of a device from a current configuration source to a target configuration source. A CCT server of the CCT system may send to the device a message requesting the configuration information of the device. In response, a CCT client of the CCT system collects the configuration information of the device and sends the collected configuration information to the CCT server. If the second configuration source can support the configuration information of the current configuration source, the CCT server requests that the device transfer control of the configuration information from the current configuration source to the target configuration source. The CCT client then transfers control of the configuration information to the target configuration source as the new current configuration source and un-enrolls the device from the former current configuration source.

20 Claims, 9 Drawing Sheets

(51) Int. Cl.
*H04W 4/50* (2018.01)
*H04L 29/08* (2006.01)
*H04L 12/24* (2006.01)
*H04W 12/00* (2009.01)

(52) U.S. Cl.
CPC ...... *H04L 41/0213* (2013.01); *H04L 41/0853* (2013.01); *H04L 41/0876* (2013.01); *H04L 41/0893* (2013.01); *H04L 67/34* (2013.01); *H04W 4/50* (2018.02); *H04W 12/0027* (2019.01)

(56) References Cited

U.S. PATENT DOCUMENTS

| | | | |
|---|---|---|---|
| 7,739,720 | B2 | 6/2010 | Samuelsson et al. |
| 8,490,163 | B1 | 7/2013 | Harsell et al. |
| 8,931,033 | B2 | 1/2015 | Esteve Balducci et al. |
| 2010/0095348 | A1 | 4/2010 | Foster et al. |
| 2012/0110128 | A1 | 5/2012 | Aaron et al. |
| 2014/0006347 | A1* | 1/2014 | Qureshi .......... H04L 63/20 707/621 |
| 2015/0133087 | A1 | 5/2015 | Stricklen et al. |
| 2015/0296368 | A1 | 10/2015 | Kaufman et al. |
| 2015/0326615 | A1 | 11/2015 | Sinha |
| 2015/0350105 | A1 | 12/2015 | Nagarajan et al. |
| 2017/0155554 | A1* | 6/2017 | Whittemore ........ H04L 41/0806 |
| 2017/0235583 | A1* | 8/2017 | Ahmed ............ G06F 9/44505 713/100 |

OTHER PUBLICATIONS

"International Search Report and Written Opinion Issued in PCT Application No. PCT/US2017/017086," dated Mar. 28, 2017, 11 Pages.
"BMC Mobile Device Management," Published on: Dec. 24, 2012, Available at: http://documents.bmc.com/products/documents/34/39/263439/263439.pdf.
"MaaS360," In White Paper of Fiberlink, May 26, 2012, pp. 1-10.
"Capabilities of built-in Mobile Device Management for Office 365," Published on: Oct. 15, 2015, Available at: https://technet.microsoft.com/en-us/library/ms.o365.cc/devicepolicysupporteddevice.aspx.
"Black Berry Enterprise Service 10," Published on: Apr. 18, 2014, Available at: http://in.blackberry.com/content/dam/blackBerry/pdf/business/english/bes10/BB-Ent-Whats-New.pdf.
"Management of Multi-OS Smart Devices Made Simple," Published on: Apr. 2015, Available at: http://info.singtel.com/business/sites/business/files/mobilitydevicemanager/Factsheet%20-%20Singtel%20Mobile%20Device%20Manager.pd.
"Cloud-Based Enterprise Mobility Management," Published on: Aug. 6, 2013, Available at: https://meraki.cisco.com/lib/pdf/meraki_datasheet_sm.pdf.
U.S. Appl. No. 14/498,198, Novales, et al., "Multi-Enrollments with Resolution Engine and User Requested Policy Override," filed Sep. 26, 2014.
U.S. Appl. No. 14/699,950, Kaufman, et al., "Multiple Phase Unenrollment for Devices under Management," filed Apr. 29, 2015.
"International Preliminary Report on Patentability Issued in PCT Application No. PCT/US2017/017086", dated May 18, 2018, 6 Pages.
"Office Action Issued in European Patent Application No. 17706629.7", dated Sep. 2, 2019, 5 Pages.

* cited by examiner

TRANSFER OF CONTROL OF CONFIGURATION SOURCES

BACKGROUND

Devices, such as mobile phones, desktop computers, laptops, tablets, and so on, may have their configuration controlled by an organization to ensure that the devices comply with the policies of the organization. For example, a company may control the configuration of mobile phones that its employees use to conduct business to ensure that sensitive information of the organization is not compromised. An organization may employ a configuration source (e.g., a program executing on a server) to manage the configuration of the devices. The configuration sources may include a Mobile Device Management ("MDM") system, Microsoft's Group Policy, Microsoft's System Center Configuration Manager, messaging servers (e.g., to synchronize emails, contacts, calendars, tasks, and notes), a classroom orchestration server, and so on. When a device enrolls with a configuration source, the configuration source provides to the device configuration information for configuring the device. The configuration information may include, for example, password requirements (e.g., 8 characters and at least one number and one letter), encryption requirements (e.g., encrypt all emails stored on the computing device), device lock requirements (e.g., lock device after 10 minutes of inactivity), email content requirements (e.g., add a legal notice to all emails), access control rights (e.g., administrator or user privilege), and so on. A program executing on a device ensures that the device operates in accordance with its configuration to ensure compliance with the policies of the organization.

Sometimes a device may have its configuration controlled by multiple configuration sources. For example, an organization may use one configuration source to control access rights to documents, another configuration source to control device security, and another configuration source to control installation of programs. With multiple configuration sources, conflicts between the configuration information of configuration sources can occur. For example, two configuration sources may specify configuration information indicating to encrypt emails, but with different types of encryption. The resolution of such conflicts resulting from multiple configuration sources can be a challenge.

The configuration sources used by an organization may need to support multiple types of hardware and software platforms. For example, the central processing unit of one device may support advanced security features (e.g., a secure cryptoprocessor), while other devices do not support such features. As another example, the devices may use different operating systems and even different versions of the same operating system. An organization may need to employ many configuration sources to support these hardware and software platforms and to manage separate policies for each platform. This management of separate policies is expensive and prone to error.

With multiple configuration sources and platforms, an organization may want to migrate devices from a set of current configuration sources to a set of new configuration sources. To perform such a migration, the devices are first un-enrolled from the current configuration sources and then enrolled with the new configuration sources. From the start of the un-enrollment until the completion of the enrollment, the policy of the organization may not be completely enforced, leaving a device vulnerable to a compromise. For example, if a device is un-enrolled from a configuration source that specifies not to install a certain application, the application may be installed in the time between the un-enrollment and enrollment in the new configuration source that specifies not to install that application.

SUMMARY

A method and system for transferring control of configuration information of a device from a current configuration source to a target configuration source is provided. In some examples, a configuration control transfer ("CCT") system associated with the target configuration source controls the transferring of control. After the request to enroll is received, a CCT server of the CCT system may send to the device a message requesting the configuration information of the device. After the request for the configuration information is received, a CCT client of the CCT system collects the configuration information of the device that is controlled by the current configuration source and sends the collected configuration information to the CCT server. After determining that the target configuration source can support the configuration information of the device that is controlled by the current configuration source, the CCT server requests that the device transfer control of the configuration information from the current configuration source to the target configuration source. The CCT client then transfers control of the configuration information to the target configuration source as the new current configuration source and un-enrolls the device from the former current configuration source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A method and system for transferring control of configuration information of a device from a current configuration source to a target configuration source is provided. In some examples, the process of transferring control may be initiated by a device requesting to enroll in the target configuration source. A configuration control transfer ("CCT") system associated with the target configuration source controls the transferring of control. The CCT system may include a server-side system (referred to as a CCT server) that executes on a server and a client-side system (referred to as a CCT client) that executes on a device. After the request to enroll is received, the CCT server may send to the device a message requesting the configuration information of the device that is controlled by the current configuration source. After the request for the configuration information is received, the CCT client collects the configuration information of the device that is controlled by the current configuration source and sends the collected configuration information to the CCT server. For example, if the device employs a centralized enrollment ("CE") system to control all enrollments and configuration information of the device, then the CCT client may interface with the CE system to collect the configuration information. The CCT server determines whether the target configuration source can support the configuration information of device. For example, the configuration information may specify use of a proprietary type of multi-factor authentication, which the target configuration source does not currently support. As another example, the target configuration source may have a list of configuration sources that it can support (e.g., generated by the developer of the target configuration source), but the current configuration source is not on the list. After determining that the target configuration source can support the configuration information of the device, the CCT server requests that the device transfer control of the configuration information from the current configuration source to the target configuration source. The CCT client then transfers control of the configuration information to the target configuration source as the new current configuration source and un-enrolls the device from the former current configuration source. For example, the CCT client may interact with the CE system to transfer control without disabling the configuration and may send an un-enroll notification to the now-former, current configuration source.

In some examples, the configuration information of a device may place limitations on the target configuration sources to which control can be transferred. The configuration information may prohibit the transfer of control to any target configuration source, to certain target configuration sources, or to all but an approved list of target configuration sources. For example, a company may not want configuration control of the devices that it provides to its employees to be transferred from the company's configuration source to the configuration source of any another company.

In some examples, a current CCT server of the current configuration source and a target CCT server of the target configuration source may communicate directly to coordinate the transfer of control. For example, a company may want to transfer the configuration control of devices of its employees from the current configuration source to a more advanced target configuration source. To transfer configuration control for a device, the current CCT server may send to the target CCT server a request to enroll the device along with the configuration information of the device. The target CCT server may determine whether the target configuration source can support the configuration information as described above. If the target configuration source can support the configuration information of the device, the target CCT server enrolls the device with the target configuration source and sends to the current CCT server a notification that it can support the configuration information. The current CCT server then sends to the CCT client of the device a request to transfer control of its configuration information from the current configuration source to the target configuration source. After completing the transfer of control, the CCT client may then send a notification to the target CCT server that the transfer of control is complete. Upon receiving the notification, the target CCT server completes the enrollment and may send to the current CCT server a notification that the transfer of control is complete so that the device can be unenrolled from the now-former, current configuration source. Alternatively, the CCT client may send a notification that the transfer of control is complete directly to the current CCT server.

In some examples, when a device has multiple current configuration sources, the CCT system may transfer control of configuration information of the device that is controlled by several current configuration sources at the same time. The CCT client requests to enroll in the target configuration source and receives a request for configuration information. For each of those several current configuration sources, the CCT client may collect its configuration information controlled by that current configuration source, send the configuration information to the CCT server, and wait for an acknowledgement from the CCT server indicating whether it supports the configuration information. If the target configuration source supports all of the configuration information, then the CCT server requests that the device transfer control of the configuration information controlled by each of those several current configuration sources to the target configuration source. The CCT client then un-enrolls from those several current configuration sources. If the target configuration source does not support all of the configuration information, the CCT server may apply various rules to determine whether to proceed with the transfer of control of some of the configuration information. For example, a new policy of an organization, as represented by the configuration information of the target configuration source, may be less restrictive than the prior policy. In such a case, a rule may indicate that, even though the target configuration source may not support the restrictive configuration information, control should still be transferred. As another example, a rule may indicate that whenever configuration information is determined to be not supported, an administrator should be notified (e.g., via console display, email, or text message) for instructions on whether to proceed with the transfer of control and if so, for which current configuration sources and configuration information.

In some examples, the CCT server can resolve conflicts that arise from the configuration information controlled by several current configuration sources. The CCT server may apply a conflict resolution algorithm that may resolve a conflict in favor of a current configuration source with a higher privilege level, in favor of a configuration source that is more restrictive or secure (e.g., higher level of encryption), and so on. The conflict resolution algorithm may specify to remove, add, or modify configuration information. If a conflict cannot be resolved, the CCT server may notify an administrator for instructions on whether to proceed with the transfer of control and if so, for which current configuration sources and configuration information.

In some examples, the CCT system thus allows conflicts between configuration information to be resolved by the single configuration source without each device executing its own conflict resolution algorithm. Even if each device does execute its own conflict resolution algorithm, there may be newly arising conflicts that the conflict resolution algorithm cannot resolve. Since the configuration source can manage all configuration information of a device, it can resolve conflicts before sending configuration information to the device. Because the CCT system allows the management of the configuration information that implements the policies of an organization to be managed by a single configuration source, an organization can also avoid the costs associated with learning, managing, and maintaining multiple configuration sources. Also, because control of the configuration information is transferred to the target configuration source, the device is not vulnerable to compromise between the un-enrollment from a current configuration source and enrollment with the target configuration source.

In some examples, the CCT client may interface with a CE system that executes on a device and provides a unified model for enrollment of a device into one or more configuration sources. The configuration sources may include internal configuration sources and external configuration sources. An internal configuration source executes on the device, and an external configuration source executes on a server external to the device. An internal configuration source may include a provisioning package that, when executed, configures the device with configuration information.

When a device enrolls in a configuration source, the CE system may specify control data for controlling the interactions with the configuration source. The control data may specify the types of configuration information that the configuration source can control based on the enrollment type(s) specified when the computing device enrolls with a configuration source. The enrollment types may indicate whether the configuration source can access all user accounts as an administrator (e.g., full enrollment type), can only access a single user account (e.g., limited enrollment type), can send a provisioning package for execution on the device (e.g., on-device enrollment type), and so on. The control data for an enrollment type specifies the configuration information that a configuration source can control. The configuration information may be grouped into categories that include policy, preferences, and resource. Policy configuration information is set by a configuration source and cannot be overridden by a (non-administrative) user of the device. Preferences configuration information is set by a configuration source, but can be overridden by a user. Resource configuration information may specify applications and data to be used or not used by the device. The configuration information may include provisioning elements that each represents a certain configuration setting. For example, a provisioning element may indicate to enable encryption or automatic backup features of a file system, prevent the downloading of applications, and specify an email content requirement. The CE system checks whether the provisioning elements comply with a policy of the device relating to changing of configuration information and if so, stores each provisioning element along with an indicator of the configuration source that controls the provisioning element in a provisioning elements data store. For example, the indicator may be a globally unique identifier ("GUID") that identifies the configuration source. When the CCT client transfers control of a provisioning element from its current configuration source to the target configuration source, it can update the indicator of the configuration source in the provisioning elements data store without any interruption in enforcement relating to that provisioning element.

The control data may also include authorization data and security data for interacting with a configuration source. The authorization data specifies actions that a configuration source is allowed to take. For example, authorization data may indicate the read-write access rights for a configuration source. The access rights may include uniform resource identifiers ("URIs") that identify resources that the configuration source is allowed to provide to the device. The security data specifies security measures to be taken when interfacing with a configuration source. For example, the security data may specify protocols for exchanging data as part of the enrollment (e.g., for exchanging data between the configuration source and the device). The security data may specify a type of encryption for exchanging data.

Figure 1:
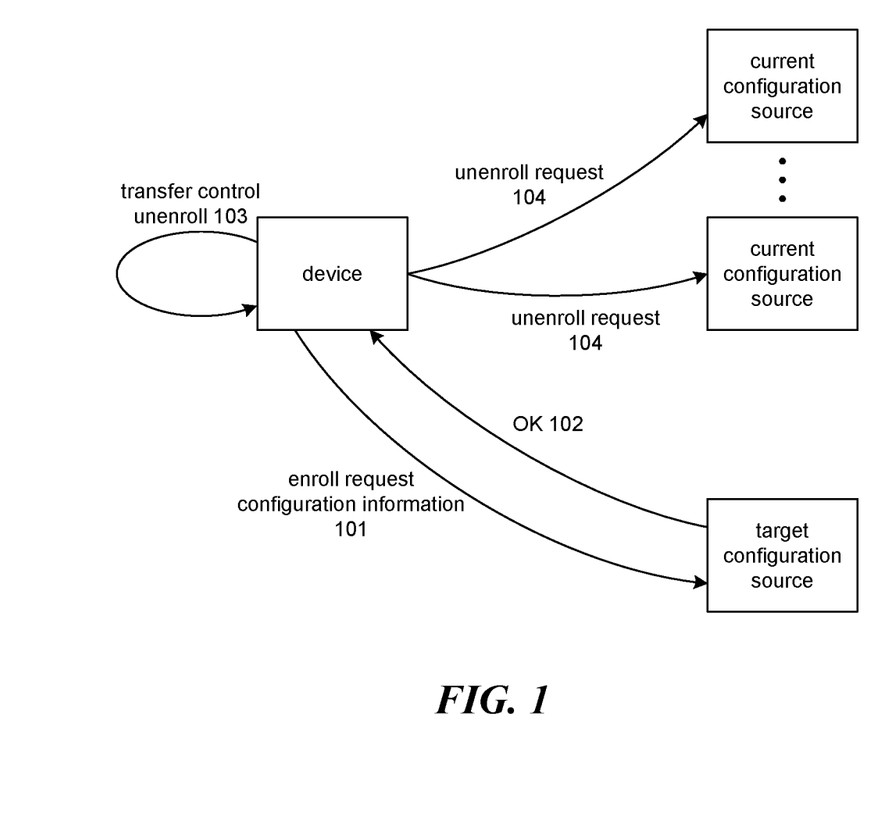
FIG. 1 is a diagram that illustrates an example transfer of control from current configuration sources to a target configuration source in some examples.

FIG. 1 is a diagram that illustrates an example transfer of control from current configuration sources to a target configuration source in some examples. Initially, the CCT client of a device sends 101 to the target configuration source a request to enroll. The request may include configuration information controlled by the current configuration sources. Alternatively, the CCT server may respond to a request to enroll by sending to the device a request for configuration information, which the device subsequently sends to the CCT server. To send the configuration information, the CCT client may collect the configuration information by interacting with the CE system to retrieve the configuration information from the provisioning elements data store. The CCT client may store the configuration information in an eXtensible Markup Language ("XML") such as that specified by the Open Mobile Alliance Device Management protocol, which was derived from The SyncML Initiative, Ltd. After determining that the target configuration source can support the configuration information, the CCT server sends 102 an acknowledgment to the device. After receiving the acknowledgment, the CCT client transfers 103 control of the configuration information from the current configuration sources to the target configuration source. The CCT client may also take other actions in support of the transfer of control. For example, the CCT client may inform the CE system that the current configuration sources have been un-enrolled and no longer have permission to modify configuration information of the device and that the device is now enrolled with the target configuration source. The CCT system may also send 104 an un-enroll message to each configuration source indicating the device is to be un-enrolled from that configuration source. The target configuration source can then control the configuration information of the device by sending to the device modifications to the configuration information.

Figure 2:
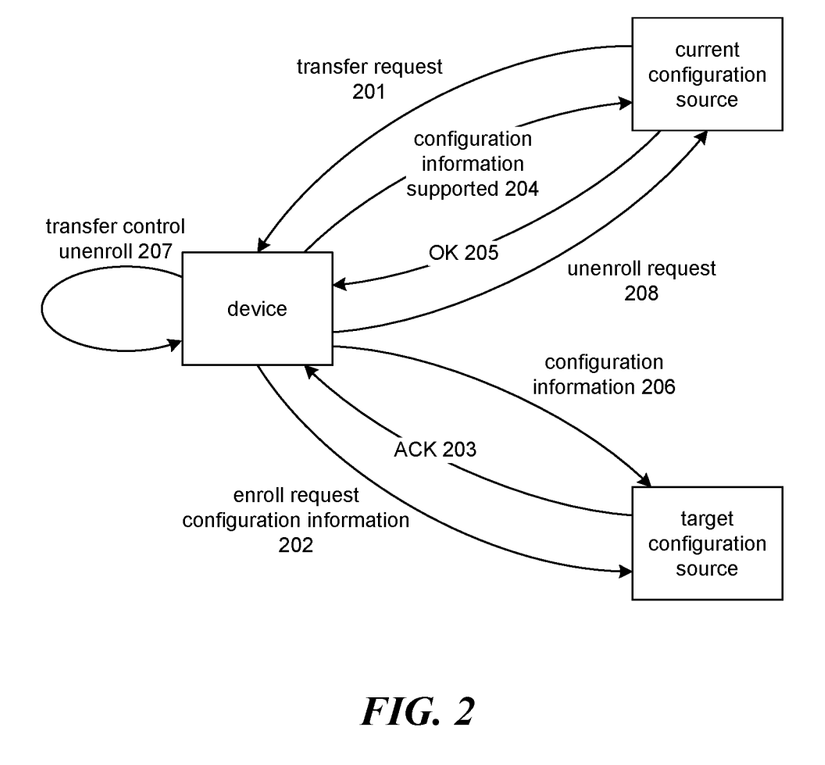
FIG. 2 is a diagram that illustrates an example transfer of control from a current configuration source to a target configuration source in some examples.

FIG. 2 is a diagram that illustrates an example transfer of control from a current configuration source to a target configuration source in some examples. In this example, an organization may be switching from the current configuration source to the target configuration source and want all of the devices enrolled in the current configuration source to be enrolled in the target configuration source. Initially, the CCT server of the current configuration source sends 201 to the device a notification to transfer control of its configuration information to the target configuration source. The notification may identify the target configuration source. In response to the receiving the notification, the CCT client of the device sends 202 to the CCT server of the target configuration source a request to enroll along with enrollment information. The CCT server of the target configuration source determines whether the configuration information can be supported and if it can be supported, sends 203 an acknowledgment to the CCT client. The CCT client then sends 204 an indication of the configuration information that is supported by the target configuration source. Assuming that the transfer is to proceed, the CCT server of the current configuration source sends 205 a message indicating to proceed with the transfer. The CCT client then sends 206 the configuration information for which control is to be transferred to the CCT server of the target configuration source. The CCT client also interacts 207 with the CE system to transfer control of the configuration information to the target configuration source and to indicate that the device is now un-enrolled from the current configuration source and enrolled with the target configuration source. The CCT client also sends 208 to the CCT server of the current configuration source an indication that it has un-enrolled from the current configuration source.

Figure 3:
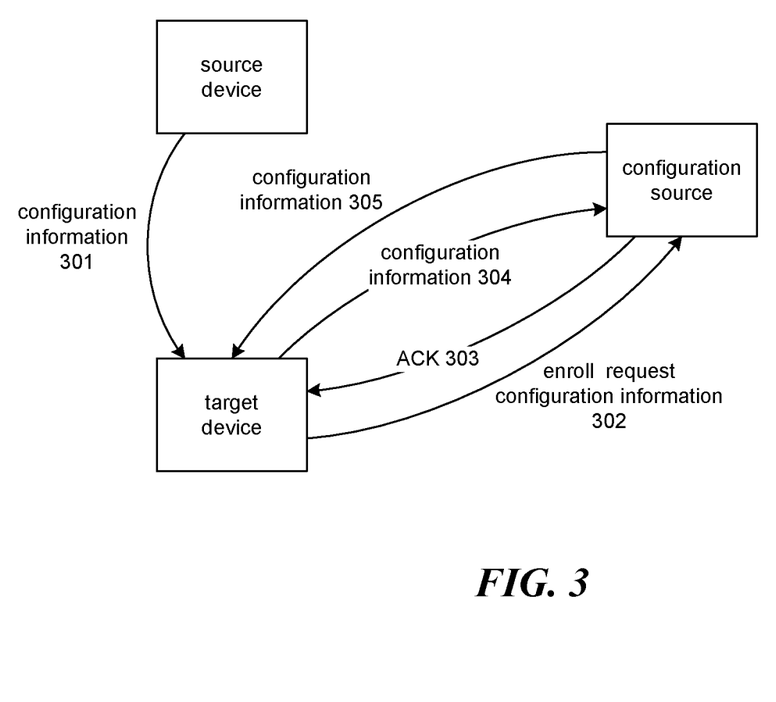
FIG. 3 is a diagram that illustrates an example of a target device being configured with configuration information of a source device in some examples.

FIG. 3 is a diagram that illustrates an example of a target device being configured with configuration information of a source device in some examples. A user of a source device may want to copy the configuration information of that source device to a target device because, for example, the user may have purchased the target device to replace the source device or to be used in addition to the source device. In this example, the configuration information of the source device is controlled by a single configuration source. In response to receiving an indication to copy the configuration information, the CCT client may collect the configuration information by interacting with the CE system and then send 301 the configuration information to the target device. Alternatively, if the source device does not use the CCT system, a copy program for collecting and sending the configuration information may be installed on the source device. The copy program may be adapted to collect configuration information for a particular type of CE system of the device, for a device that does not use a CE system, and so on, and also adapted to a particular hardware and software platform. The source device may send the configuration information over a communication channel (e.g., a cellular connection) or via a storage medium (e.g., a USB flash drive). After receiving the configuration information, the CCT client of the target device sends 302 an enroll request with configuration information to the CCT server of the configuration source. The CCT server determines whether the configuration source can support the configuration information and, if it can support the configuration information, sends 303 an acknowledgment to the CCT client of the target device. The acknowledgment may indicate which configuration information can be supported and which cannot. If the CCT client determines to proceed with the enrollment, the CCT client of the target device sends 304 to the CCT server the configuration information that it wants the configuration source to control. The configuration source then sends 305 the configuration information to, for example, the CE system of the target device for provisioning the target device with the configuration information.

Figure 4:
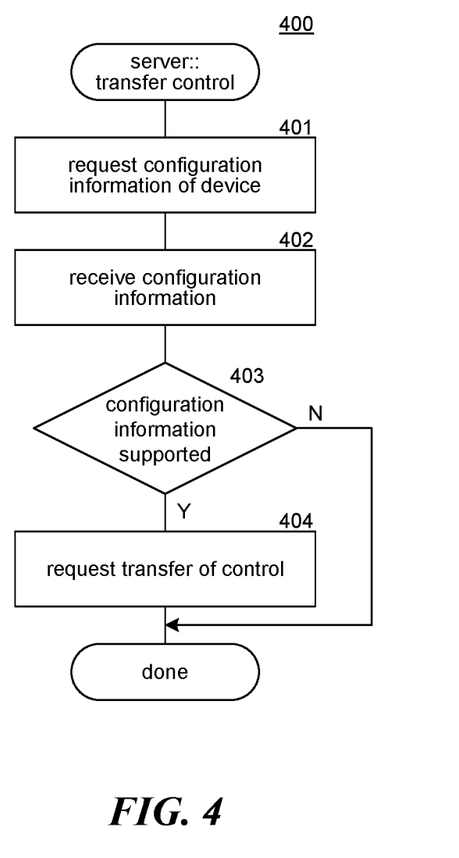
FIG. 4 is a flow diagram that illustrates the overall operation of a CCT server to transfer control in some examples.

FIG. 4 is a flow diagram that illustrates the overall operation of a CCT server to transfer control in some examples. A transfer control component 400 of the CCT server may start upon receipt of a request to enroll that indicates as part of the enrollment to transfer control from a current configuration source to a target configuration source. In block 401, the component sends to the device a request for its configuration information. In block 402, the component receives from the device the configuration information. In decision block 403, if the target configuration source can support the configuration information, then the component continues at block 404, else the component completes without transferring control. In block 404, the component sends to the device a request to transfer control to the target configuration source and may complete the enrollment of the device. The component then completes.

Figure 5:
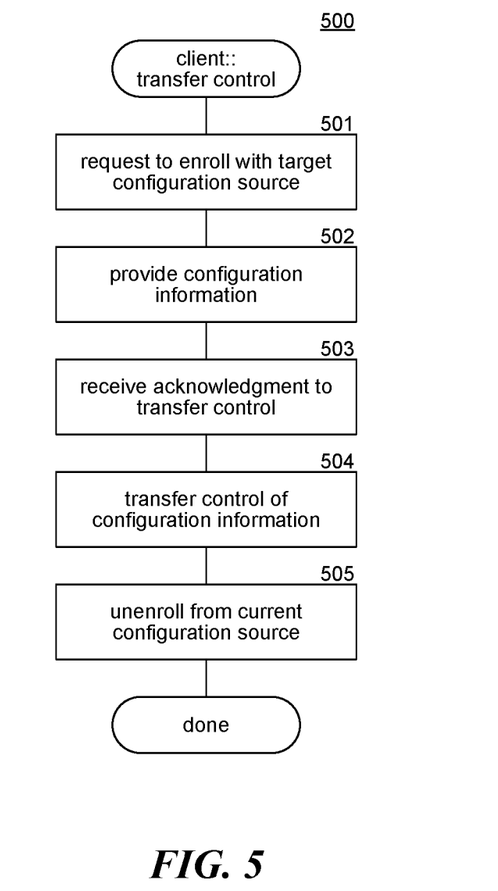
FIG. 5 is a flow diagram that illustrates the overall operation of a CCT client to transfer control in some examples.

FIG. 5 is a flow diagram that illustrates the overall operation of a CCT client to transfer control in some examples. A transfer control component 500 of the CCT client may start when a user requests to transfer control of the configuration information of the device from its current configuration source to a new configuration source (i.e., the target configuration source). In block 501, the component sends to the CCT server of the target configuration source a request to enroll. In block 502, in response to receiving from the CCT server a request for configuration information, the component sends to the CCT server the configuration information. In block 503, the component receives from the CCT server an acknowledgment to proceed with the transfer of control. In block 504, the component transfers control of the configuration information of the device from the current configuration source to the target configuration source, for example, by interacting with the CE system or directly modifying a data store of configuration information. In block 505, the component un-enrolls the device from the now-former, current configuration source and enrolls the device with the target configuration source by, for example, interacting with the CE system, and then completes.

Figure 6:
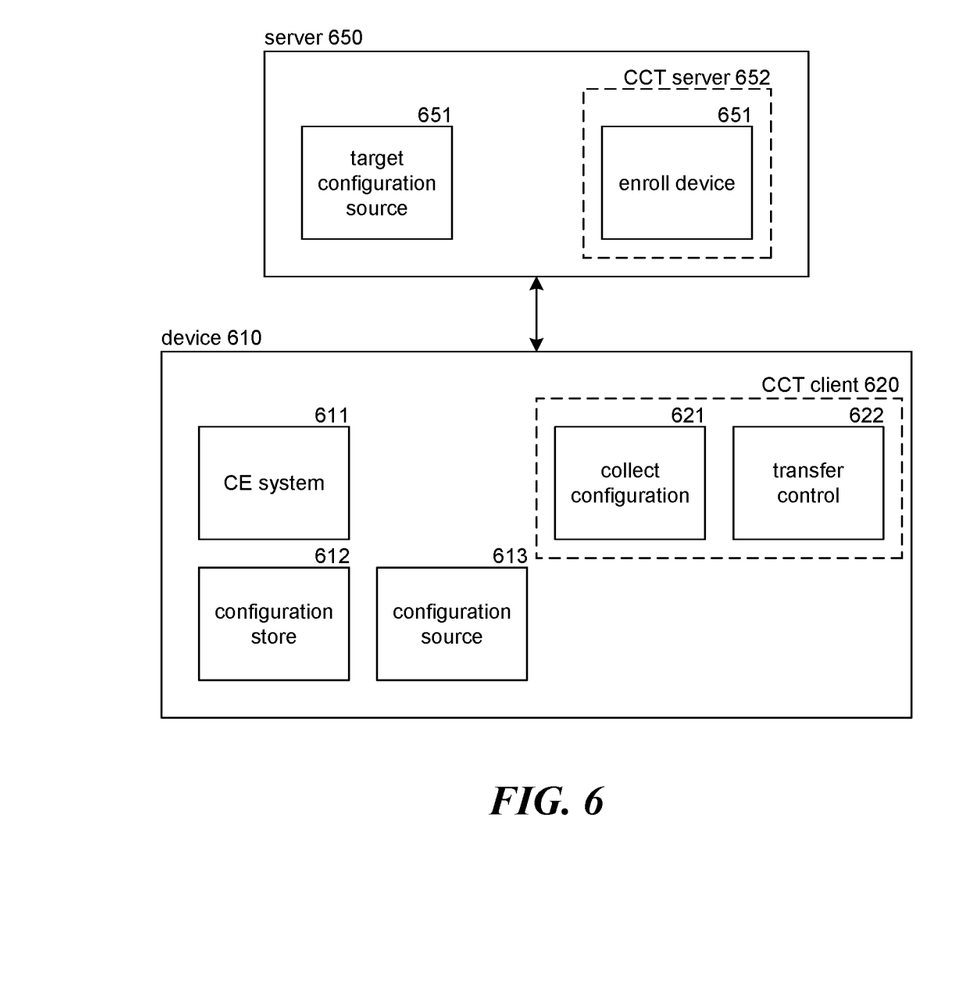
FIG. 6 is a block diagram that illustrates components of the CCT system in some examples.

FIG. 6 is a block diagram that illustrates components of the CCT system in some examples. In this example, a device 610 includes a CE system 611, a configuration store 612, and a configuration source 613. The device also includes a CCT client 620 with a collect configuration component 621 and a transfer control component 622. A server 650 includes a target configuration source 651 and a CCT server 652 with an enroll device component 653. Although illustrated as being implemented on the same server, the target configuration source and the CCT server may be implemented on separate servers or distributed across many servers. The CE system controls the enrollment of various configuration sources on the device and stores the configuration information in the configuration store (e.g., provisioning elements data store). The configuration source 613 is an internal configuration source that interacts with the CE system to specify and control its configuration information. The collect configuration component of the CCT client interacts with the CE system to collect the configuration information from the configuration store. The transfer control component of the CCT client controls the transfer of control from a current configuration source to a target configuration source. The target configuration source provides the overall configuration management for enrolled devices. The target configuration source may be adapted to support the configuration information of any type of configuration source such as MDM systems, messaging servers, group policy managers, configuration managers, and so on. The enroll device component of the CCT server controls the enrolling of devices with the target configuration source and transferring control of configuration information.

Figure 7:
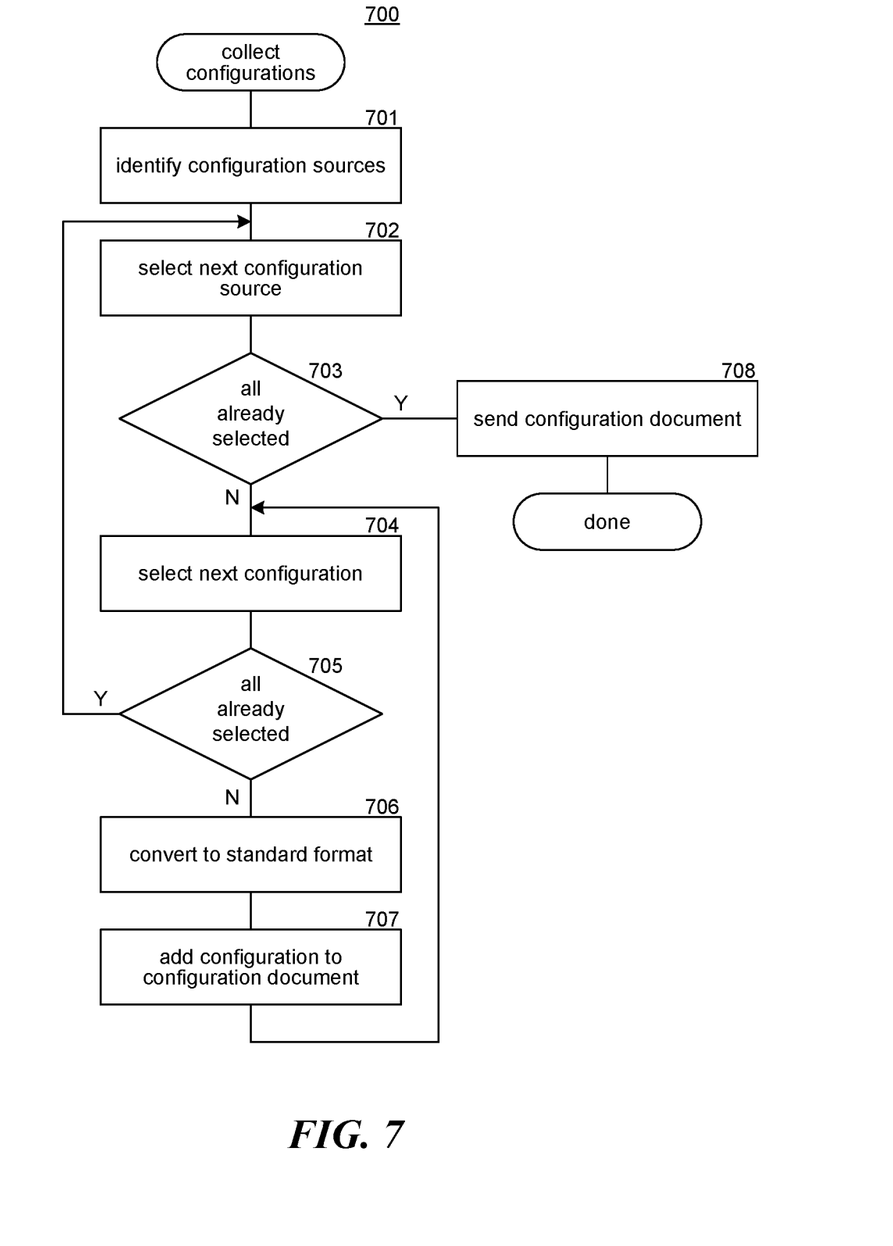
FIG. 7 is a flow diagram that illustrates the processing of a collect configurations component of a CCT client in some examples.

FIG. 7 is a flow diagram that illustrates the processing of a collect configurations component of a CCT client in some examples. A collect configurations component 700 collects configuration information from a CE system and sends the configuration information to a CCT server. In block 701, the component interacts with the CE system to identify the various current configuration sources of the device. In block 702, the component selects the next current configuration source starting with the first. In decision block 703, if all the current configuration sources have already been selected, then the component continues at block 708, else the component continues at block 704. In block 704, the component selects the next configuration item (e.g., provisioning element). In decision block 705, if all the configuration items have already been selected, then the component loops to block 702 to select the next current configuration source, else the component continues at block 706. In block 706, the component converts the selected configuration item to a standard format (e.g., an XML format). In block 707, the component adds the configuration item to a configuration document and then loops to block 704 to select the next configuration item. In block 708, the component sends the configuration document to the CCT server and completes.

The computing systems on which the CCT system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The devices on which a CCT client executes are computing systems that may include desktop computers, laptops, tablets, e-readers, personal digital assistants, smartphones, gaming devices, servers, and so on. The computing systems on which a CCT server executes may include servers of a data center, massively parallel systems, and so on. The computing systems may access computer-readable media that include computer-readable storage media and data transmission media. The storage media, including computer-readable storage media, are tangible storage means that do not include a transitory, propagating signal. Examples of computer-readable storage media include memory such as primary memory, cache memory, and secondary memory (e.g., DVD) and other storage media. The computer-readable storage media may have recorded on them or may be encoded with computer-executable instructions or logic that implements the CCT system. The data transmission media are used for transmitting data via transitory, propagating signals or carrier waves (e.g., electromagnetism) via a wired or wireless connection. The data may be transmitted using various data transmission protocols such as the Transmission Control Protocol ("TCP"), the Internet Protocol ("IP"), user datagram protocol ("UDP"), and so on. The computing systems may include a secure cryptoprocessor as part of a central processing unit for generating and securely storing keys, and for encrypting and decrypting data using the keys.

The CCT system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the CCT system may be implemented in hardware using, for example, an application-specific integrated circuit ("ASIC").

Figure 8:
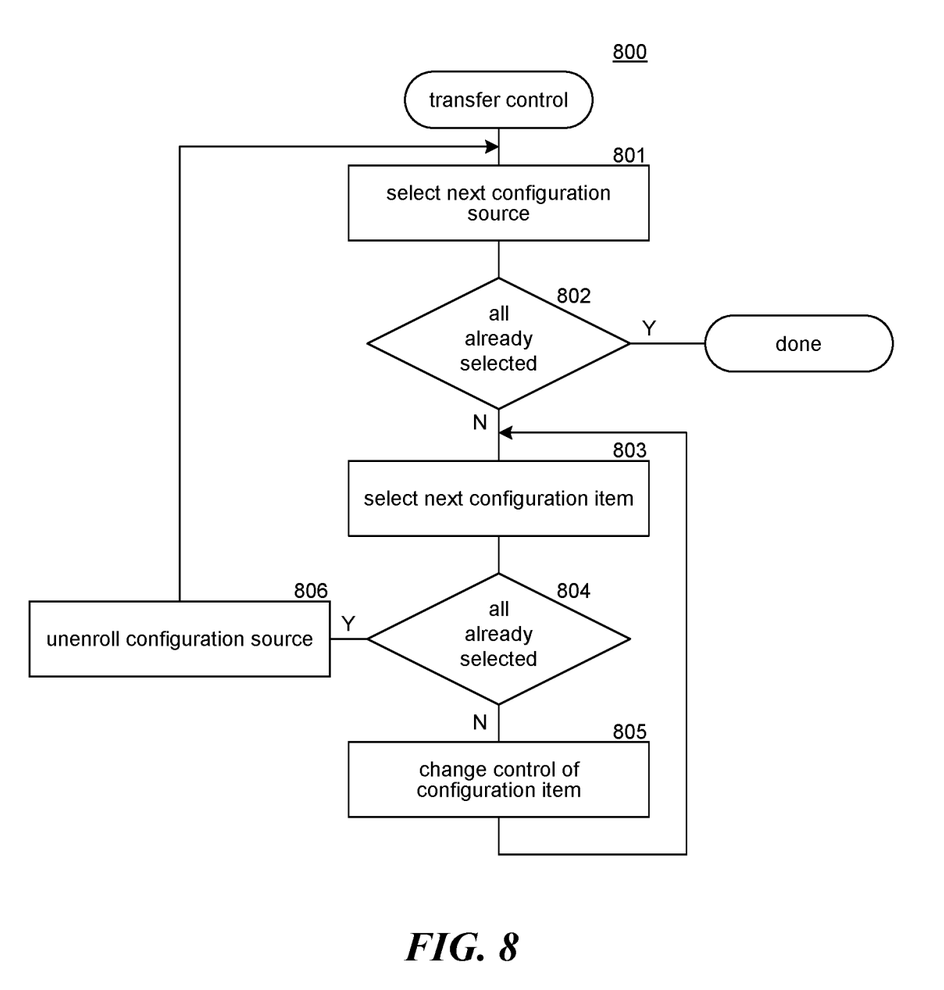
FIG. 8 is a flow diagram that illustrates the processing of a transfer control component of a CCT client in some examples.

FIG. 8 is a flow diagram that illustrates the processing of a transfer control component of a CCT client in some examples. A transfer control component 800 is invoked to change control of the configuration information from a current configuration source to a target configuration source. In block 801, the component selects the next current configuration source. In decision block 802, if all the current configuration sources have already been selected, then the component completes, else the component continues at block 803. In block 803, the component selects the next configuration item of the selected current configuration source. In decision block 804, if all such configuration items have already been selected, then the component continues at block 806, else the component continues at block 805. In block 805, the component changes control of the configuration item from its current configuration source to the target configuration source. For example, the component may replace the GUID associated with a provisioning element of the provisioning elements data store from that of the current configuration source to that of the target configuration source. The component then loops to block 803 to select the next configuration item. In block 806, the component un-enrolls the device from the selected current configuration source and then loops to block 801 to select the next current configuration source.

Figure 9:
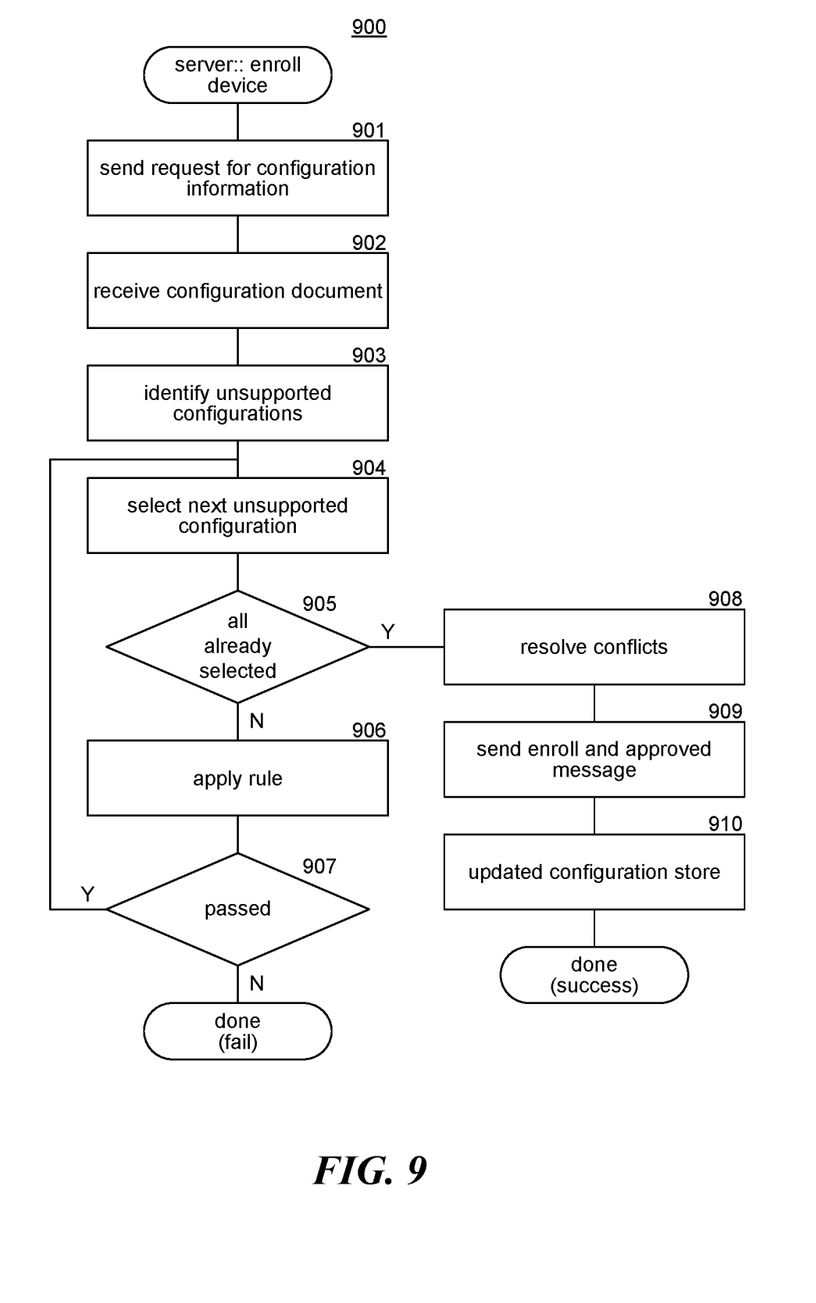
FIG. 9 is a flow diagram that illustrates the processing of an enroll device component of a CCT server in some examples.

FIG. 9 is a flow diagram that illustrates the processing of an enroll device component of a CCT server in some examples. An enroll device component 900 is invoked to control the enrollment of a device with a target configuration source and transfer control of the configuration information of the device to the target configuration source. In block 901, the component sends to the device a request for configuration information. In block 902, the component receives from the device a configuration document that includes the configuration information. In block 903, the component identifies whether there is any unsupported configuration information. For example, the component may interact with the target configuration source to determine whether each configuration item can be supported. Alternatively, the component may access a list of configuration sources that the target configuration source is known to support. In block 904, the component selects the next unsupported configuration item, if any. In block 905, if all the unsupported configuration items (if any) have already been selected, then the component continues at block 908, else the component continues at block 906. In block 906, the component applies one or more rules to determine whether the transfer can proceed even though the selected configuration item is not supported. In decision block 907, if the rules pass, then the component loops to block 904 to select the next unsupported configuration item, else the component completes with an indication that the control of the configuration information was not transferred. In block 908, the component resolves conflicts between the configuration items. When resolving conflicts, the component may identify modifications that need to be made to the configuration information of the device. In block 909, the component sends to the device an approval message indicating to transfer control of the configuration information from the current configuration source to the target configuration source. The approval message may also include an indication of the modifications that need to be made to the configuration information as a result of resolving a conflict or of any other modifications the target configuration source may specify. In block 910, the component updates the configuration store of the target configuration source with the new configuration information.

The following paragraphs describe various examples of aspects of the CCT system. An implementation of a CCT system may employ any combination of the examples.

In some examples, a method performed by a computing system for transferring control of configuration information of a device from at least one first configuration source to a second configuration source is provided. The method requests the configuration information of the device where the configuration information of the device is currently under control of the at least one first configuration source.

The method receives the requested configuration information of the device. The method determines whether the second configuration source is able to support the configuration information of the first configuration source. Based at least on a determination that the second configuration source is able to support the configuration information of the device, the method requests that the device transfer control of its configuration information from the first configuration source to the second configuration source. In some examples, the method, prior to requesting the configuration information of the device, receives a request to enroll the device with the second configuration source. In some examples, the method, based at least on the determination that the second configuration source is able to support the configuration information of the device, requests that the device be un-enrolled from the first configuration source and enrolls the device with the second configuration source. In some examples, the at least one first configuration source is one of a plurality of first configuration sources that control configuration information of the device. In some examples, the method, based at least on determining that the second configuration source is unable to support the configuration information of the device, determines whether to enroll the device with the second configuration source. In some examples, the determining whether to enroll the device with the second configuration source includes prompting a person to indicate whether to enroll the device with the second configuration source. In some examples, the determining whether to enroll the device with the second configuration source includes applying rules to determine whether to enroll the device with the second configuration source. In some examples, the received configuration information of the device is in a format compatible with the Open Mobile Alliance Device Management protocol. In some examples, the method, after requesting that the device transfer control of its configuration information from the at least one first configuration source to the second configuration source, sends to the device a modification to the configuration information of the device.

In some examples, a method performed by a device for transferring control of configuration information of the device from at least one first configuration source to a second configuration source is provided. The method requests to enroll the device with the second configuration source. The method sends to the second configuration source configuration information of the device. The method receives from the second configuration source a request to transfer control of the configuration information of the device from the at least on first configuration source to the second configuration source. The method, based at least on receiving the request to transfer control of the configuration information of the device from the at least one first configuration source, transfers control of the configuration information of the device to the second configuration source and un-enrolls the device from the at least one first configuration source. In some examples, the method, prior to sending the configuration information of the device, receives from the second configuration source a request for the configuration information of the device. In some examples, the method requests an enrollment system of the device to extract configuration information of the device. In some examples, the method organizes the extracted configuration information into a standard format. In some examples, the standard format is a format compatible with the Open Mobile Alliance Device Management protocol. In some examples, the transferring of control includes requesting a centralized enrollment system of the device to transfer the control of the configuration information of the device to the second configuration source. In some examples, the transferring of control includes requesting a centralized enrollment system of the device to un-enroll the device from the first configuration source. In some examples, the method, after transferring control of the configuration information of the device to the second configuration source, receives from the second configuration source a modification to the configuration information of the device.

In some examples, one or more computer-readable storage mediums store computer-executable instructions for controlling one or more computing systems to transfer control of configuration information of a device from a first configuration source to a second configuration source. The computer-executable instructions comprise computer-executable instructions of a client component that, when executed by the device, send to the second configuration source a request to enroll the device with the second configuration source and configuration information of the device that is controlled by the first configuration source; receive from the second configuration source a confirmation of enrollment; and based at least on receiving the confirmation of enrollment, transfer control of configuration information of the device to the second configuration source and un-enrolls the device from the first configuration source. In some examples, the computer-executable instructions further comprise computer-executable instructions of a server component that, when executed by a computing system, receive from the device the request to enroll the device with the second configuration source and configuration information of the device that is controlled by the first configuration source; determine whether the second configuration source is able to support configuration information of the device; and based at least on determining that the second configuration source is able to support configuration information of the device send to the device the confirmation of enrollment. In some examples, the computer-executable instructions of the server component that, when executed by a computing system, further based at least on determining that the second configuration source is unable to support the configuration information of the device, determine whether to enroll the device with the second configuration source even though the second configuration source is unable to support the configuration information of the device. In some examples, the computer-executable instructions of the client component that, when executed by a computing system, further interact with a centralized enrollment system to extract configuration information of the device and transfer control of configuration information the device from the first configuration source to the second configuration source.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method, performed by a device, for transferring control of configuration information of the device from a first configuration source to a second configuration source, the method comprising:
   the device, while enrolled with the first configuration source, requesting the second configuration source to enroll the device with the second configuration source;

the device sending, to the second configuration source, configuration information of the device;

the device receiving a confirmation, from the second configuration source, that indicates that the second configuration source has determined that the second configuration source is able to support the configuration information of the device;

based at least on the receiving of the confirmation from the second configuration source, the device transferring, to the second configuration source, control of the configuration information of the device to enroll the device with the second configuration source; and after the transferring of control by the device, the device un-enrolling the device from the first configuration source.

2. The method of claim 1, further comprising prior to the device sending the configuration information of the device, the device receiving from the second configuration source a request for the configuration information of the device.

3. The method of claim 1, further comprising the device requesting extraction of configuration information of the device.

4. The method of claim 3, further comprising the device organizing the extracted configuration information into a standard format.

5. The method of claim 4, wherein the standard format is a format compatible with the Open Mobile Alliance Device Management protocol.

6. The method of claim 3, wherein the transferring of control by the device includes requesting the device to transfer the control of the configuration information of the device to the second configuration source.

7. The method of claim 3, wherein un-enrolling the device includes the device requesting the device to un-enroll the device from the first configuration source.

8. The method of claim 1, further comprising after the transferring of control by the device, the device receiving from the second configuration source a modification to the configuration information of the device.

9. One or more computer-readable storage media storing computer-executable instructions for controlling a computing system to transfer control of configuration information of a device from a first configuration source to a second configuration source, the computer-executable instructions comprising:

computer-executable instructions of a client component that, when executed by the device, cause the client component to:

send a request from the device to the second configuration source to enroll the device with the second configuration source, wherein the request is sent while the device is still enrolled with the first configuration source;

send from the device to the second configuration source configuration information of the device that is controlled by the first configuration source;

receive, by the device, a confirmation from the second configuration source that indicates that the second configuration source has determined that the second configuration source is able to support the configuration information of the device;

based at least on the receiving of the confirmation from the second configuration source, transfer, by the device to the second configuration source, control of configuration information of the device to enroll the device with the second configuration source;

after the transferring of control by the device, un-enroll, by the device, the device from the first configuration source.

10. The one or more computer-readable storage media of claim 9, wherein the computer-executable instructions further comprise computer-executable instructions of a server component that, when executed by the computing system, cause the server component to:

receive from the device the request to enroll the device with the second configuration source and the configuration information of the device that is controlled by the first configuration source;

determine whether the second configuration source is able to support the configuration information of the device; and based at least on determining that the second configuration source is able to support the configuration information of the device, send to the device the confirmation.

11. The one or more computer-readable storage media of claim 10, wherein the computer-executable instructions of the server component that, when executed by the device, further based at least on determining that the second configuration source is unable to support the configuration information of the device, determine whether to enroll the device with the second configuration source even though the second configuration source is unable to support the configuration information of the device.

12. The one or more computer-readable storage media of claim 9, wherein the computer-executable instructions of the client component that, when executed by the device, cause the device to extract configuration information of the device and transfer control of configuration information of the device from the first configuration source to the second configuration source.

13. A computing system for transferring control of configuration information of a device from a first configuration source to a second configuration source, comprising:

the device;

one or more memories;

one or more processors coupled to the one or more memories; and one or more computer readable storage media storing instructions that, when executed, cause the one or more processors to perform the following operations:

send a request from the device to the second configuration source to enroll the device with the second configuration source, wherein the request is sent while the device is still enrolled with the first configuration source;

send from the device to the second configuration source configuration information of the device that is controlled by the first configuration source;

receive a confirmation at the device from the second configuration source that indicates that the second configuration source has determined that the second configuration source is able to support the configuration information of the device; and based at least on the receiving of the confirmation from the second configuration source, transfer, to the second configuration source by the device, control of configuration information of the device to enroll the device with the second configuration source;

after the transferring of control by the device, un-enroll the device from the first configuration source by the device.

14. The system of claim 13, wherein the operations further comprise prior to sending the configuration information of the device, receiving from the second configuration source a request for the configuration information of the device.

15. The system of claim 13, wherein the operations further comprise requesting the device to extract configuration information of the device.

16. The system of claim 15, wherein the operations further comprise organizing the extracted configuration information into a standard format.

17. The system of claim 16, wherein the standard format is a format compatible with the Open Mobile Alliance Device Management protocol.

18. The system of claim 15, wherein the transferring of control includes requesting the device to transfer the control of the configuration information of the device to the second configuration source.

19. The system of claim 15, wherein the un-enrolling the device includes the device requesting the device to un-enroll the device from the first configuration source.

20. The system of claim 13, wherein the operations further comprise, after the transferring of control by the device, receiving bar the device from the second configuration source a modification to the configuration information of the device.

* * * * *